Aug. 9, 1938.   J. SCHMELLER, SR   2,125,958
ENGINE COOLING DEVICE
Filed Aug. 9, 1934   6 Sheets-Sheet 2
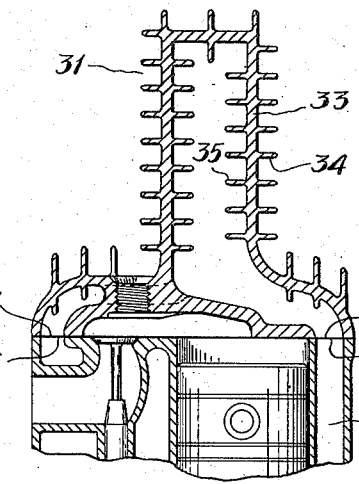
FIG. 5.
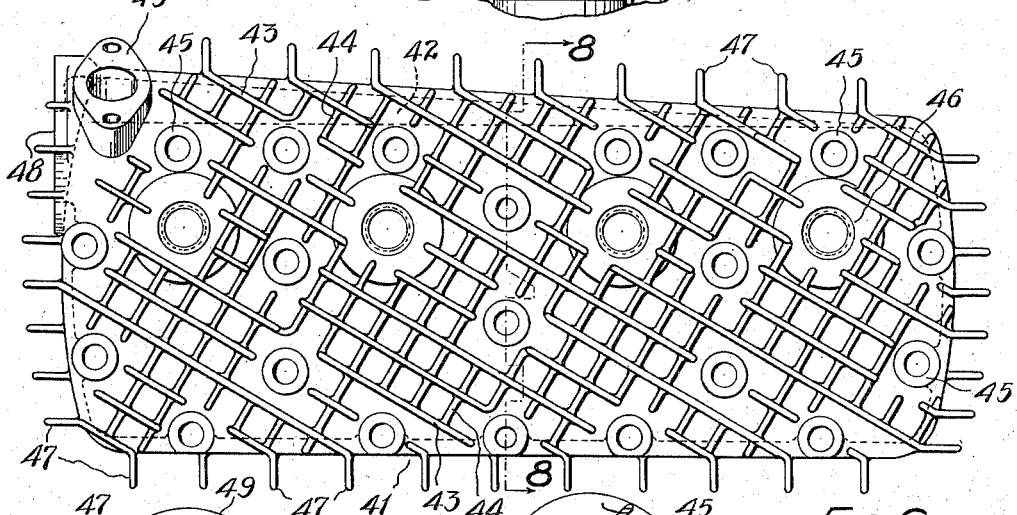
FIG. 6.
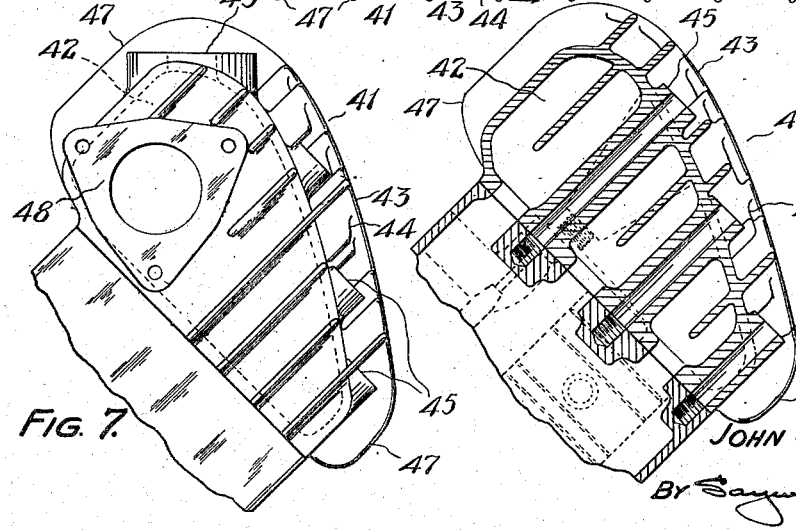
FIG. 7.
FIG. 8.
INVENTOR:
JOHN SCHMELLER SR.
ATTORNEYS

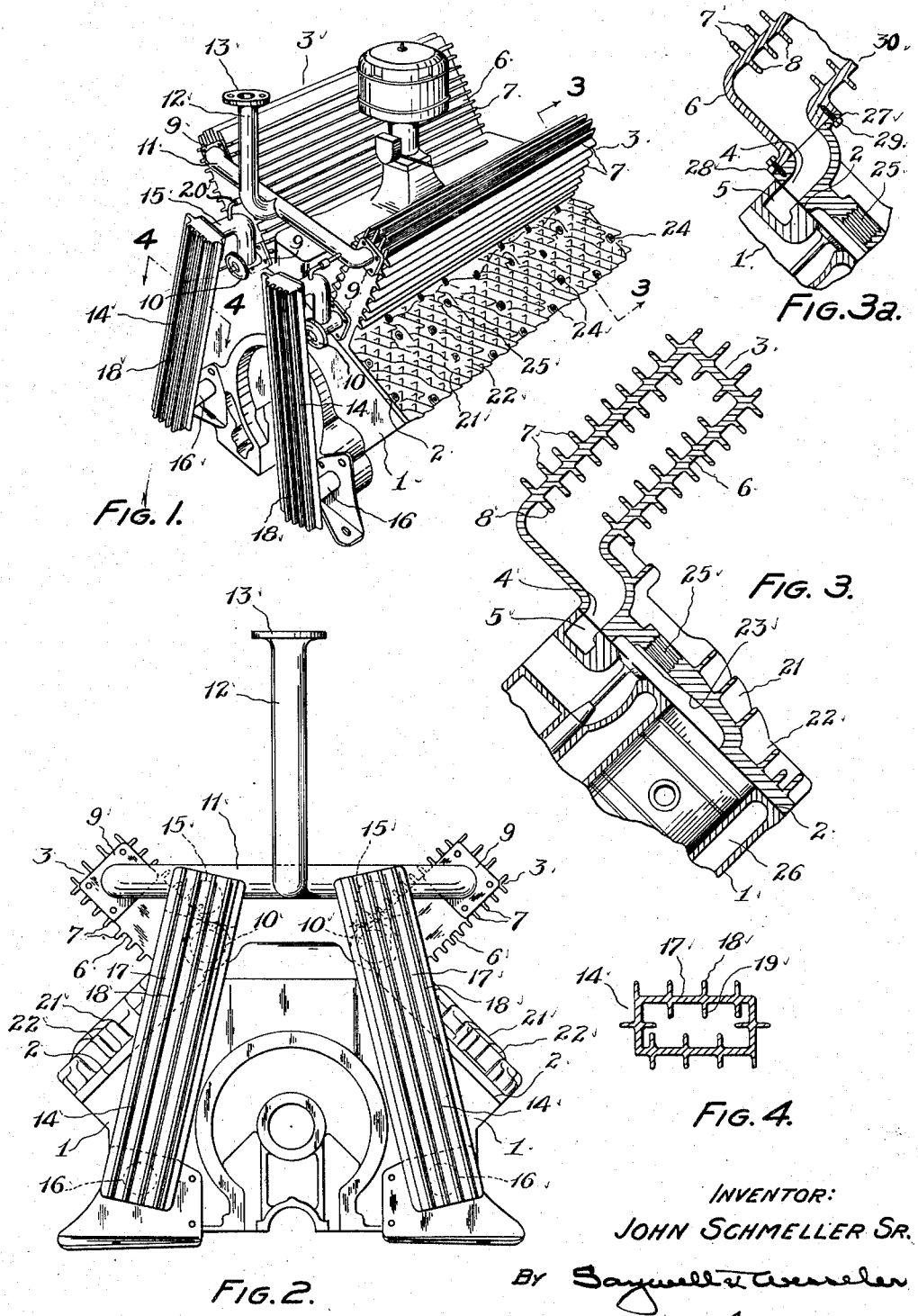

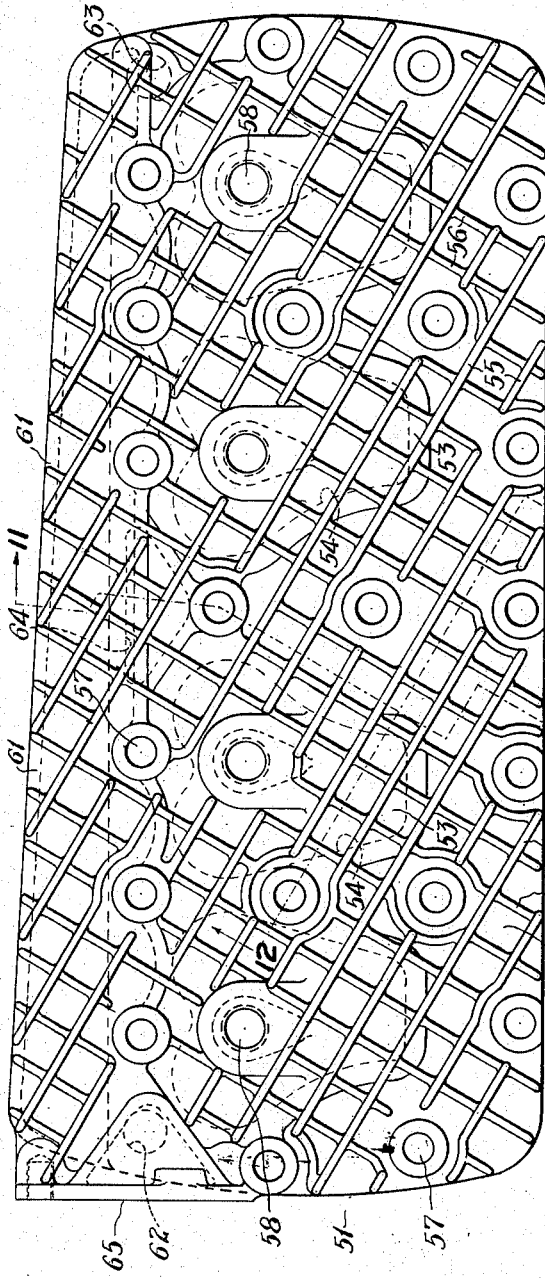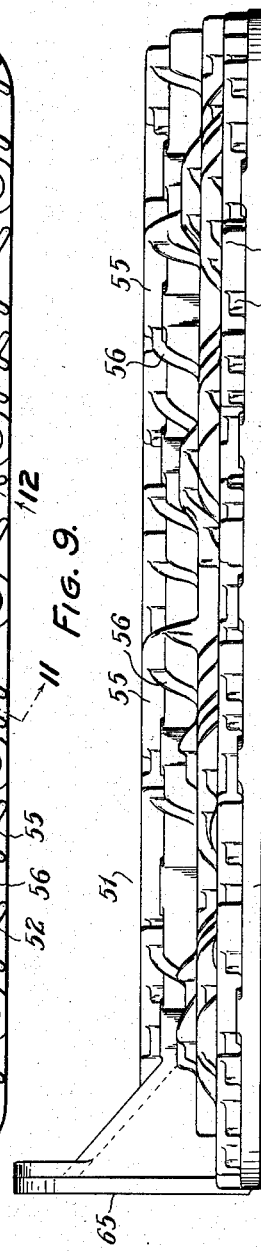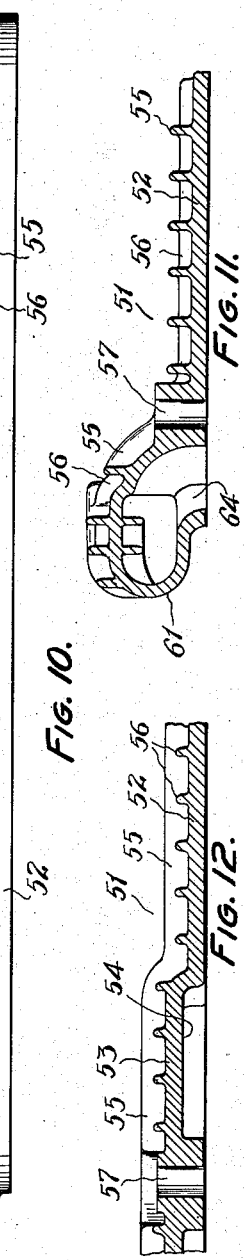

Aug. 9, 1938.  J. SCHMELLER, SR  2,125,958
ENGINE COOLING DEVICE
Filed Aug. 9, 1934  6 Sheets—Sheet 4
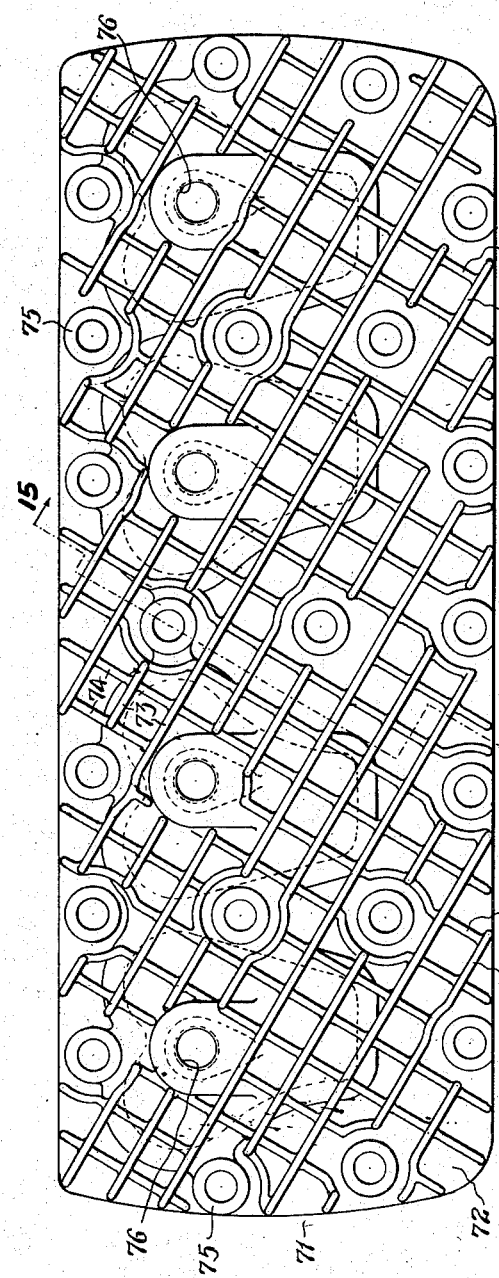
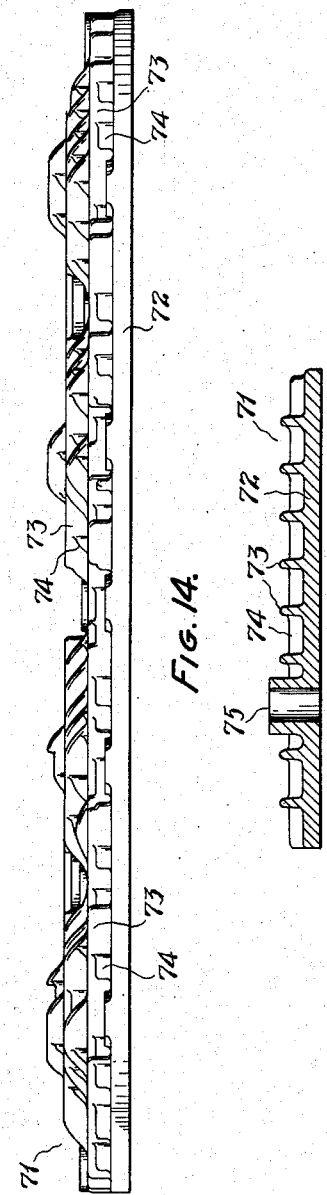
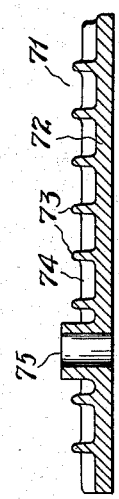
INVENTOR:
JOHN SCHMELLER SR.
BY
ATTORNEYS

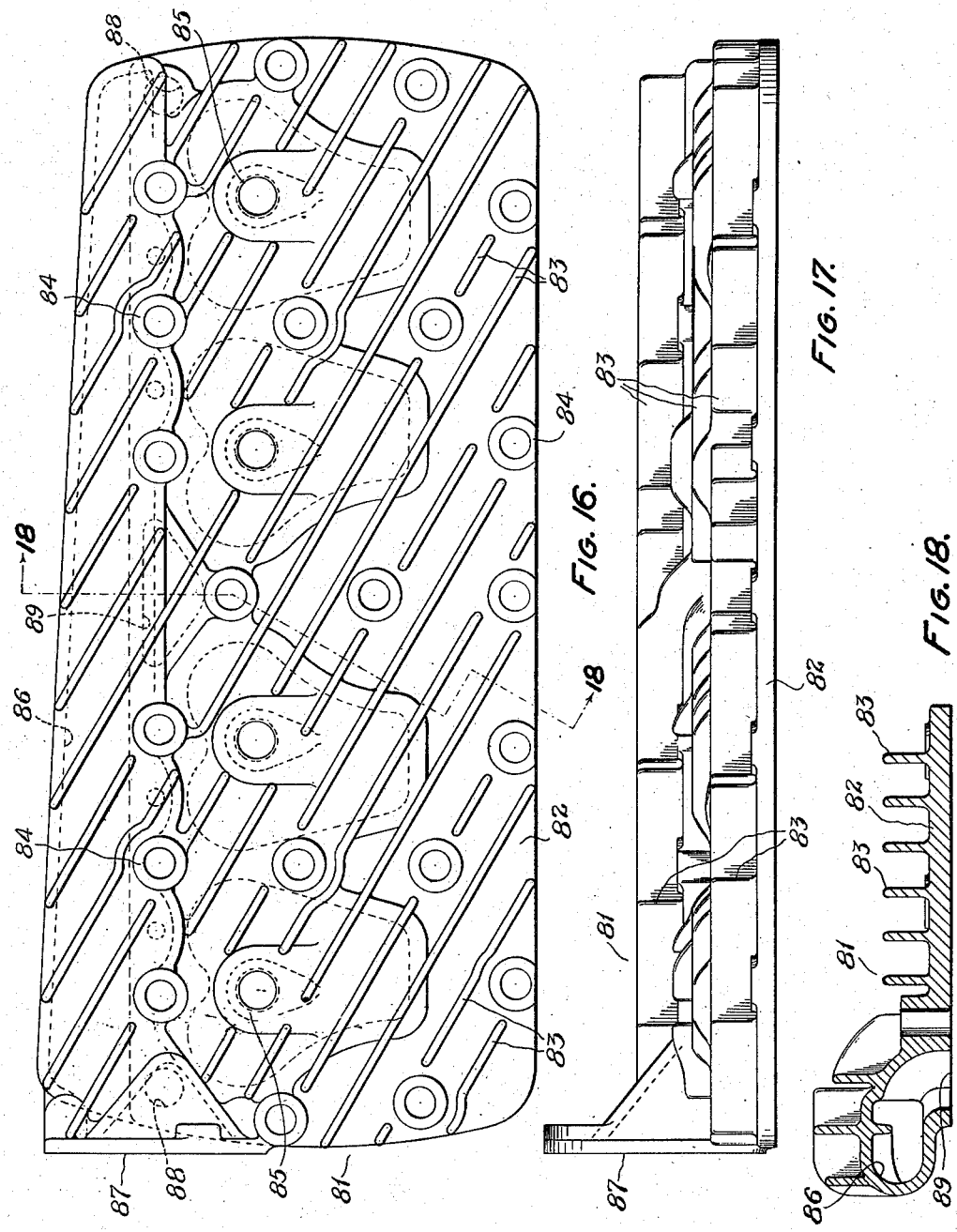

Aug. 9, 1938.   J. SCHMELLER, SR   2,125,958
ENGINE COOLING DEVICE
Filed Aug. 9, 1934   6 Sheets-Sheet 6

INVENTOR:
JOHN SCHMELLER SR.
BY Saywell & Wesseler
ATTORNEYS

Patented Aug. 9, 1938

2,125,958

UNITED STATES PATENT OFFICE 2,125,958

ENGINE COOLING DEVICE

John Schmeller, Sr., Lakewood, Ohio

Application August 9, 1934, Serial No. 739,115

23 Claims. (Cl. 123—173)

This invention, as indicated, relates to an engine cooling device. More particularly, it provides an improved means for dissipating the heat originating in the operation of an internal combustion engine. The invention includes a head member adapted especially for use on an internal combustion engine cylinder block, which has more effective heat transfer properties than such head members as are now commonly employed. It also contemplates the combination of a head member having an exceptionally high degree of heat conducting and radiating capacity, and the utilizing of such head member either alone or in combination with a fluid cooling system to bring about the maintenance of a satisfactory operating temperature in the engine. The invention also has in view the reduction in size of the radiator on an automobile having an engine equipped with the head members herein described, or the elimination of the radiator from the cooling system. In such instance, connecting members having fins or webs may be made part of the water circulating systems. The invention also contemplates the provision of a head member with or without associated cooling elements, which will withstand extremes of heat as well as extremes of cold without seriously affecting its capacity for adequate heat exchange for the purpose stated. It is thus adapted for a very wide range of applications including use in hot desert areas as well as in localities where the prevailing temperature is very low and where extremes of cold are met which interfere seriously with the operation of usual types of internal combustion engines.

The invention has in view the use of a metal head member formed of metals or alloys having high heat conducting and radiating characteristics, such head members being so fabricated as to provide for a predetermined heat dissipating ratio as required by the engine structure to which it is applied. The head member may be formed as a substitute head to be applied to engines heretofore provided with water cooled heads or heads formed of metals of inferior heat dissipating qualities or without the particular arrangement of fins or webs presently to be described. It also includes other radiation means.

Heretofore it has been the practice to provide for elaborate conduits and air passageways about the heads of air cooled engines with high capacity blowers to pass an unusual quantity of air over fins or radiating elements intended to dissipate the heat. It has been found that such elaborate installations of auxiliary mechanism are unnecessary, and that with a properly designed head of metal of high conductivity and radiating capacity an adequate degree of cooling can be attained without any auxiliary equipment, and that the cooling effect can be enhanced so that the head will not only take care of the heat normally imparted to the head member through the combustion of the gases in the engine, but can function so efficiently as to dissipate the heat imparted to a water cooling system extending around the water jackets in the side walls of the engine block.

The invention herein provides a head member having adequate cooling capacity for an engine operating under standard conditions at a predetermined range of temperatures and in addition to such use is applicable to an engine operating on a high compression ratio and using the less volatile fuels. The head member so provided permits more rapid increase to operating temperature when the motor is started, and maintains such temperature with a smaller degree of variation due to high or low outside temperature conditions than with cooling systems at present in use.

It is to be noted that the total mass of the head member and its radiating fins or webs may be kept at a minimum by using a thin walled section for the head member proper and using the radiating fins or webs as reinforcing members. Such reinforcement is particularly effective when the radiating webs are in the form of substantially rectangular pockets, the base portion of each web merging with the wall of the head member along a broadened base area providing a substantial fillet at the junction line of each side of the web member where it meets the wall of the head member. A similar fillet is formed where the companion series of web members crosses the first series, the rectangular pockets thus having rounded side and bottom corner portions and producing convection currents. This provides for a rigid structure formed with a minimum of metal and the shape of the pockets provides for adequate contact with the air moving over the head portion to accomplish the desired amount of heat exchange.

From the standpoint of production, the invention permits the fabrication of head members of the air cooled type through casting operations without the use of complicated cores for forming internal water passageways, such cores being very expensive adjuncts to the construction of water cooled heads and being of a fragile nature and involving much loss through wastage. Where, however, the cooling system is designed for some degree of water cooling combined with more effective air cooling, the conventional radiator may be reduced in size or dispensed with, or simplified radiating elements operating on the principles set forth in this application may be utilized, and a saving effected in manufacturing cost in this manner, even though in such instances the cost of complicated cores is not eliminated.

To the accomplishment of the foregoing and related ends, said invention, then, consists of the means hereinafter fully described and particularly pointed out in the claims, the annexed drawings and the following description setting forth in detail certain structures embodying the invention, such disclosed means constituting, however, but several of various forms in which the principle of the invention may be used.

In said annexed drawings:

Figure 1 is a perspective view showing a V-type engine embodying the principles of my invention;

Figure 2 is a front elevation of the structure shown in Figure 1;

Figure 3 is an enlarged sectional detail view of a portion of the structure shown in Figure 1, taken along the line 3—3, looking in the direction of the arrows; Figure 3a is a similar view showing a modification;

Figure 4 is an enlarged sectional view of one of the connecting conduits taken along the line 4—4, shown in Figure 1, looking in the direction of the arrows;

Figure 5 is an enlarged sectional detail view showing a modified form of construction embodying the principles of the invention as applied to a multi-cylinder straight engine block of L-head type;

Figure 6 is a top plan view of a water cooled head member of enlarged capacity adapted to operate with a radiator of reduced size or without a radiator in the circulation system;

Figure 7 is a front elevation of the structure shown in Figure 6;

Figure 8 is a sectional detail view of the structure shown in Figure 6, taken along the line 8—8, looking in the direction of the arrows;

Figure 9 is a top plan view of a solid air cooled head member carrying a marginal water passageway and embodying the principles of the invention;

Figure 10 is a side elevation of the structure shown in Figure 9;

Figure 11 is a transverse sectional view of the structure shown in Figure 9, taken along the line 11—11, looking in the direction of the arrows;

Figure 12 is a fragmentary sectional view of the structure shown in Figure 9, taken along the line 12—12, looking in the direction of the arrows;

Figure 13 is a top plan view of a solid air cooled head member embodying the principles of the invention;

Figure 14 is a side elevation of the structure shown in Figure 13;

Figure 15 is a transverse sectional view taken along the line 15—15, shown in Figure 13, looking in the direction of the arrows;

Figure 16 is a top plan view of a structure similar to that shown in Figure 12, but having differently positioned radiating fins;

Figure 17 is a side elevation of the structure shown in Figure 16;

Figure 18 is a transverse sectional view of the structure shown in Figure 16, taken along the line 18—18, looking in the direction of the arrows;

Figure 19:
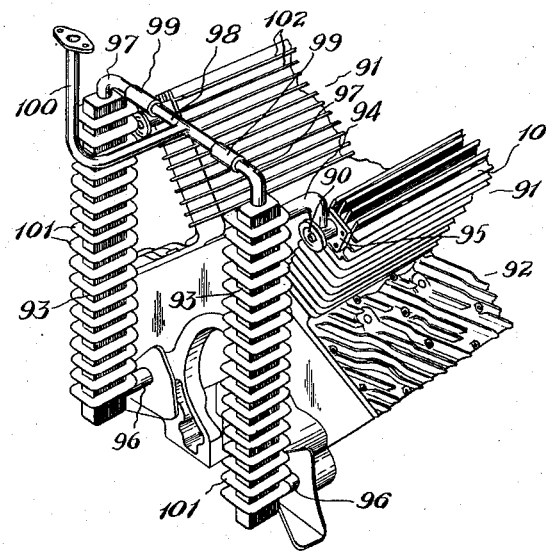
Figure 19 is a fragmentary perspective view showing an engine of the type illustrated in Figure 1, with modified form of connections for the water cooling circuit.

The structures shown in Figures 1 to 4 inclusive relate to the application of the invention to a V-type motor, the type shown being that used on Ford cars. The engine shown is designed to operate without a radiator of the conventional type at the front of the car, and is provided with a water cooling system about the cylinder walls.

As will be clearly seen from the drawings, the engine block 1 is provided for each series of cylinders with a head member 2 formed as a solid head member over the cylinder area, but having an extension 3 forming a passageway for the water circulating around the cylinder walls. The extension shown takes the place of the marginal water distributing passageway on the conventional type of head member in the structure referred to, and communicates with the water passageways in the cylinder block in the usual manner, as is shown in Figure 3, where the passageways connect through the opening 4 in the head member, registering with the opening 5 in the cylinder block.

The water capacity of the extension of the head member is proportioned to the amount of radiating action required to produce the proper operating temperature of the engine. It may be made of various forms, but as shown, has walls 6 of substantially rectangular outline, over the greater extent of which external ribs 7 and internal ribs 8 are provided.

The internal and external ribs are preferably in alinement with each other and integrally formed with the casting. The end walls of the extension may have ribs if desired, but are shown without ribs, much of the space at the end of the extension being taken up with attaching terminals 9 for the various water circulating conduits. A pump driven by a grooved pulley 10 adapted to be engaged by a fan belt or the like may be positioned in the passageway adjacent the lowermost of the attaching terminals 9. One of these conduits comprises a transverse passageway 11 connecting the opposite extensions adjacent their upper portions along a substantially horizontal line and communicating at an intermediate point with a filler tube 12 which may be connected with the front portion of the hood structure by means of the terminal 13, such filler tube rising in a substantially vertical direction to a point above the level of the head extensions 3, and constituting an expansion pipe for the cooling system. The usual connections of the water cooling system of a V-type engine with the radiator are retained as points of connection for the water circulation system, but in place of circulating water through a radiator, the connecting channels are themselves made to assist to some extent in dissipating the heat, although not involving the usual radiator structure.

The connecting members comprise a pair of water conduit elements 14, each connected by a short extension 15 with the water passageway in each respective head member of the engine, and connected by a short extension 16 with the water passageways of each respective cylinder block. The water conduit elements are preferably formed of cast metal having high capacity for heat conduction and radiation, and as shown in Figure 4, may be of substantially rectangular form having flat walls 17 preferably carrying external ribs 18 and internal ribs 19. The ribs as shown extend longitudinally of the water conduit elements, but may be otherwise disposed or provided with angularly intersecting series of rib members similar to the head members hereinafter to be described. Pressure relief passageways 20 may be provided connecting the conduits 15 with the cross conduit 11.

The devices as shown in Figures 1 to 4 are adapted to be applied to a standard V-type engine block without disturbing the other parts of such structure. They may also be incorporated in an engine structure particularly designed to utilize the features herein set forth.

As will be seen more particularly in Figure 3, the head member 2 of the engine is provided on its upper side with a series of webs or ribs 21 extending angularly across the engine head from the front upper corner in a direction rearwardly toward the outer margin of the engine head. The ribs 21 are a series of parallel ribs and are intersected by a series of parallel ribs 22 preferably of somewhat less height and thickness than the series of ribs 21. Each rib series, as will be noted in Figure 3, are preferably of substantially equal height throughout and conform to the contour of the upper surface of the head member which is enlarged over each cylinder area to provide a recess 23 on its under side over the firing chamber and valve passageways, but may be varied to localize the various ratios of heat exchange.

The cylinder head is provided at intervals with bosses 24 suitably apertured to provide for securing bolts to be engaged therethrough, and also with threaded spark plug openings 25. The cylinder head 2 and its extension 3 may be formed integrally as shown in Figure 3, or may be a separate part or extension 30 attached to the head as shown in Figure 3a, by means of flanges 27 on the head member secured to flanges 28 on the extension 30 by means of connecting bolts 29. The heads are preferably formed of aluminum alloy or some like material having high heat conducting and radiating capacity. The volume of water within the water jackets 26 of the engine block and within the extension 3 or 30 and the other elements of the circulating system heretofore described should be suitably proportioned to the predetermined operating temperature of the engine. With a structure of the type above described, it will be found that the usual radiator in the cooling system may be dispensed with, and that an engine equipped as described will reach operating temperature more rapidly and maintain such temperature more effectively than where a water cooling system of the conventional type is employed.

The invention just described is applicable to other types of engines than the V-type, and Figure 5 illustrates the head of a multiple cylinder engine having a straight block with a substantially centrally positioned water distributing passageway in the head. In the form shown in Figure 5, the water distributing passageway or extension 31 has a generally rectangular shape with flat walls 33 and a series of parallel longitudinally extending external ribs 34 and internal ribs 35, the internal ribs being preferably in alinement with the external ribs. Suitable apertures 36 are provided in the engine head to connect with registering apertures 37 in the cylinder block to provide for the usual circulation of water through the water jacket 38. The auxiliary conduits and connecting members may be substantially the same as those provided for one of the cylinder heads shown in Figures 1 and 2.

It is to be understood in some instances that a small radiator in the usual position on the automobile may be utilized if desired.

In place of using a solid head for the Ford V-type engine as shown in Figures 1 to 3 inclusive, the head member 41 may be formed as shown in Figures 6 to 8 inclusive, wherein greater depth is provided interiorly of the head to form a water chamber 42 of greater capacity than the conventional type head, and heat radiating means are provided to increase the heat dissipating effectiveness of the head member. The radiating means, as shown, may comprise a series of parallel ribs 43 disposed angularly across the head and intersected by the similar parallel series of ribs 44 extending at substantially right angles to the first series of ribs, the first series being preferably directed rearwardly and being of slightly greater height and thickness than the other series of ribs. Suitably apertured bosses 45 are provided for securing elements such as head bolts, and other bosses 46 are provided to receive spark plugs. The fins at the sides and ends of the cylinder head may comprise single vertical series of ribs 47. A suitable terminal or connection 48 provides for the connection with the inlet passageway to a pump and another connection 49 provides for the attachment of the filling and expansion pipe.

When it is desired to utilize a solid cylinder head member and retain the usual water jackets about the side walls of the cylinders with the distributing passageways in the head, a construction such as is shown in Figures 9 to 12 may be used, such structure comprising a head member 51 having a solid plate 52 over the greater portion of its extent conforming to the usual contour of the upper portion of the engine block and providing elevated portions 53 to provide recesses 54 beneath the same over the firing chambers and valve chambers. The head member shown is formed with intersecting series of ribs, one series of ribs 55 extending diagonally in a rearward direction and the other series of ribs 56 extending diagonally across the first series of ribs and being preferably of somewhat lesser height than the first series of ribs. Suitable bosses 57 provide bolt apertures to secure the head to the block, and other bosses 58 provide openings for the spark plugs.

The head when placed on a V-type engine is formed at its upper lateral margin with a distributing conduit 61 preferably of slightly flattened outline, as shown in Figure 11, said conduit preferably carrying on its upper surface extensions of the intersecting ribs on the head member proper. The head member is formed with suitable openings 62, 63 and 64, communicating with the conventional water passageways in the block of a Ford V-type engine, and is formed at the forward portion of the water distributing passageway with a terminal boss or connection 65 by which it is may be placed in communication with the radiator of the standard type automobile. The other radiator connections of the automobile will remain as at present, and the engine thus will be air cooled over its head portion and water cooled about the side walls of the cylinders. It will be found that the water passageway 61 through the marginal portion of the head will be cooled to a certain extent through the radiating effect of the head itself which, as has been indicated, is formed of metal of high capacity for heat conduction and radiation, such as aluminum alloy, or the like.

In Figures 13 to 15, a head member 71 is shown wherein a solid plate 72 is provided suitably reinforced by a series of angularly extending ribs 73 directed toward the lower and rearward side of the head member and intersected by a series of parallel angularly disposed rib members 74 of slightly lesser height than the first series of rib members. The head is formed without any water distributing passageway at any point whatsoever and may be utilized on an engine air cooled throughout or having an independent water circulating system. The head is provided with bosses 75 apertured to receive the securing bolts and with other bosses 76 apertured to receive the spark plugs. The intersecting ribs conform to the contour of the elevations over the firing chambers and valve chambers so as to provide substantially equal heat radiating effect over the entire upper surface of the head member. The intersecting ribs permit the use of a thinner plate due to the very effective reinforcing effect of the intersecting ribs.

In place of using intersecting ribs, and where the structure does not require economy of material or where the heat dissipating characteristics require a somewhat heavier head member, the form of construction illustrated in Figures 16 to 18 may be utilized, wherein the head member 81 is formed of a solid plate 82 having a single series of parallel ribs 83, such ribs as shown being interrupted at intervals to provide for the bosses 84 apertured to receive the securing bolts and the bosses 85 apertured to receive the spark plugs. The head member is shown as having a water distributing passageway 86 at the upper side thereof, such passageway preferably having flattened upper and lower walls with a series of ribs, the ribs over the body of the head continuing across a portion of the same. A suitable boss 87 is provided at the front end of the water distributing passageway for connection with the radiator in the manner heretofore described. The head is formed with apertures 88 and 89 to communicate with the usual water distributing apertures in the engine block.

It is to be understood that in each of the forms of construction shown and described, utilization is made of the high heat conducting and radiating capacity of the metal of the structures which, as stated, is preferably aluminum alloy or some equally satisfactory metal of such character.

The form of construction shown in Figure 1 provides for a substantially closed circuit for the water circulation line, for each bank of cylinders of the V-type motor. Each circuit in such structure is provided with a pressure relief connection with a transverse passageway connecting the two extensions which serve as principal radiating elements for the water circulation system. In place of having the transverse passageway connect the upper portions of the extension, a construction such as is shown in Figure 19 may be adopted, wherein the extensions 91 mounted on the respective cylinder heads 92 are provided with water conduit elements 93 of somewhat greater height than the water conduit elements 14 shown in Figure 1. The upper ends of said elements are connected respectively by means of short extension conduits 94 with the terminals 95 at the upper ends of the extensions 91. A suitable type of pump may be embodied in the terminal connection 95, such pump being operated by means of a grooved pulley 90 operated by the fan belt or the like, to insure proper circulation of the water through the system. A short extension 96 serves to connect the lower portion of the water conduit element 93 with the water jacket in the cylinder block. At the top of each of the water conduit elements 93 a terminal 97 is provided, adapted to connect with the cross passageway 98 by means of flexible connections 99 or the like, said cross passageway carrying an extension filler tube 100 which preferably is positioned adjacent the front portion of the hood of an automobile for convenience in filling.

In the construction shown in Figure 1 of the drawings, each of the water conduit elements 14 is provided with longitudinally extending ribs and such conduits are rectangular in shape with their broader portions faced toward the front of the automobile. In the form of construction shown in Figure 19, the webs or fins 101 comprising the radiating members on the water conduit elements are positioned transversely of the length of said members and said elements 93, while substantially of the same cross section as the elements 14, are set with their narrow edges toward the front of the automobile so as to have the longer sides of the web members contacting with the air flow through the space beneath the hood and substantially in alinement with the longitudinal ribs 102 on the extensions 91. The respective series of ribs 101 and 102 are preferably provided with internal ribs in each of the members to which they are attached which may be formed so as to be substantially in alinement with the external ribs. In this manner more effective heat transfer can be brought about through the use of the device.

As has been heretofore stated, the invention is applicable to various types of motors, including those having a V-type motor, those having straight engine blocks of the L-head or other types, and also motors of the valve-in-head type.

Figure 20:
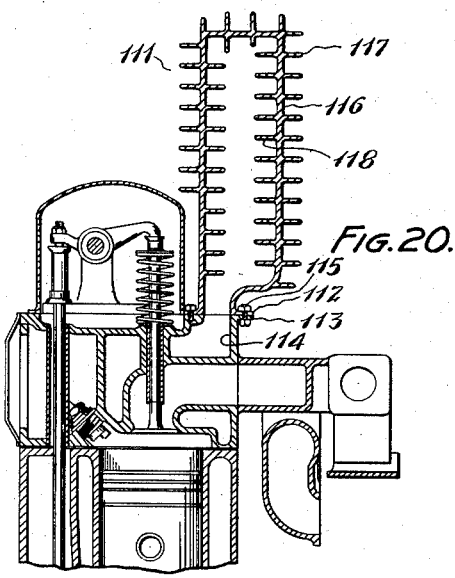
Figure 20 is a fragmentary vertical sectional view showing the invention as applied to a valve-in-head engine.

With the valve-in-head type of motor, such as is shown in Figure 20, it is desirable to provide a head member in the form of a vertical extension 111 having flanges 112 at the base adapted to be connected to the flanges 113 of the engine head member 114 by means of securing bolts 115. The extension is preferably of substantially rectangular shape having flat walls 116 from the outer surfaces of which a series of spaced parallel web members 117 project, said members preferably being in alinement with internal web members 118 projecting inwardly from the inner surfaces of the extension. By providing a valve-in-head engine with an extension of the character indicated and connecting it by means of a water conduit element similar to the element 93 shown in Figure 19 to provide a water circuit through the top and bottom of said element back to the water jacket of the engine block, satisfactory water cooling of the head of a valve-in-head type motor can be brought about, and the conventional type of radiator may be dispensed with, or in any event the size of the radiator employed may be greatly reduced.

Figure 23:
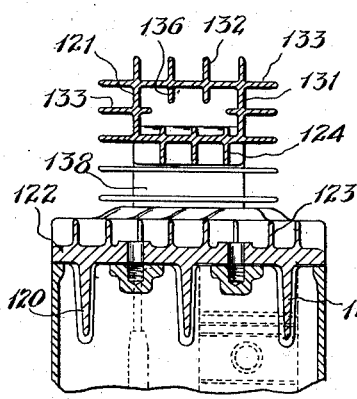
Figure 23 is an enlarged fragmentary sectional view of the structure shown in Figures 21 and 22, taken along the line 23—23, looking in the direction of the arrows.
Figure 22:
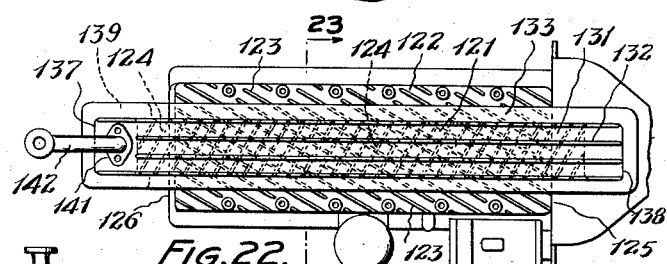
Figure 22 is a top plan view of the structure shown in Figure 21.
Figure 21:
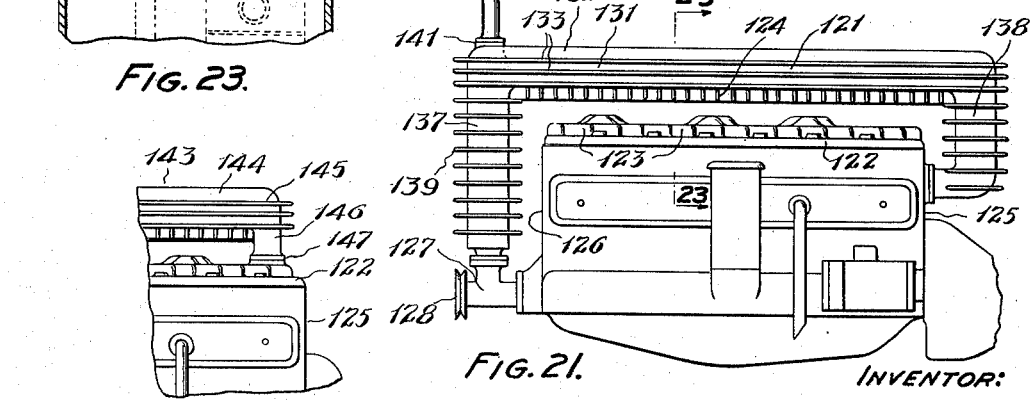
Figure 21 is a side elevation of a structure wherein the radiating element for the water cooling system is spaced from the head member.

Instead of providing a water radiating extension as an integral or an associated part of the head member of the engine, the adequate cooling of the water around the side walls of the cylinders in the engine block may be accomplished by means of a radiating element 121 in spaced relation to the head member 122 as is shown more particularly in Figures 21 and 22. The head member employed may be substantially of the type shown in Figure 13, wherein the head member is entirely free of water cooling elements. Such head member may have heat radiating elements formed thereon of any desired size and construction, but in the form shown in Figure 21, are preferably upstanding parallel webs or fins 123 extending diagonally in one direction across the engine head. At points wherein the solid head member 122 covers open water jacketed areas inside the engine block, integral radiating elements 128 may be provided, such elements being preferably in the form of downwardly tapered pencils, preferably star shaped in cross section, as shown in Figure 23.

The radiating element on its under side is provided with a series of downwardly directed parallel webs or fins 124 extending diagonally across the under side of the radiating element in a direction opposite the direction of the ribs 123 on the cylinder head member.

The radiating element 121, as shown in Figure 21, extends from the rearward face of the engine block 125 upwardly and thence longitudinally above the engine to a point spaced outwardly of the front wall 126 of the engine block and thence downwardly to the lower connection 127 to the water jacket area within the engine block. A suitable pump may be provided within said connection, said pump being driven by a grooved pulley 128 in the conventional manner.

The pump is frequently driven by the fan belt, and each of the types of engines hereinbefore described may be provided with the usual fan at the front of the engine. The radiator may be replaced by a grill or similar structure permitting free flow of air beneath the hood.

The radiating element 121 may be formed as a substantially rectangular structure having flat walls 131 with a series of outwardly extending external longitudinal rib members 132 on the upper face thereof, and outwardly extending series of parallel rib members 133 on each of the respective sides thereof, and the diagonally extending rib members 124 upon the under side thereof, as heretofore described. Rib members 136 parallel to the respective series of rib members above described may be formed on the inner walls of the radiating element, as is clearly shown in Figure 23. The rib members just described relate to the longitudinally extending section of the radiating member and not to the vertical sections 137 and 138 at the forward and rearward ends of the motor, respectively, which end members are provided with external ribs 139 extending transversely of said members and parallel to the rib members on the longitudinal portion. Internal rib members may be formed within the vertical sections of the radiating member in alinement with the external rib members. A suitable terminal 141 is provided at the forward end of the longitudinal portion of the radiating element and a filling tube 142 is secured thereto with its upper end in substantially the usual position of the filler opening at the front of the hood portion of an automobile.

Figure 24:
Figure 24 is a fragmentary side elevation showing the radiating element connecting with the water cooling system through the head member.

The size and position of the radiating element shown in Figures 21 to 23 may be varied to provide for the particular needs of the engine to be serviced by such structure. It frequently occurs that adequate space to form connections with the water jacket in the motor block and its rearward face is not provided, and in such instance, it may be desirable to connect the radiating element to the water jacket through the engine head, as is shown in Figure 24. In said figure, the radiating element 143 is formed with a longitudinal section 144 having longitudinal ribs 145 and having a short vertical section 146 at its rearward end connecting directly with the engine head member 122 through the terminal plate 147 suitably apertured to connect with the water jacket in the engine block.

While a number of applications of the cooling device have been described, it is to be understood that the particular constructions set forth are merely suggestive and in no sense exhaustive of the types of constructions for which the device is adapted. While radiating elements in the form of ribs or webs or fins have been referred to and shown in the various positions, it is to be understood that the equivalent of such elements is in contemplation when the same are referred to under any of such particular designations. Thus, in Figure 23, in place of webs or fins, elongated pointed elements in the form of downwardly extending pencils having fluted sides have been shown and serve effectively as heat transfer means providing extended surface contact areas. It is likewise to be understood that for certain types of motors it may be found desirable to combine features shown in conjunction with one combination of cooling device in one of the forms illustrated and another form of cooling device in another of the forms, and that the particular combinations of the several water conduit elements and head members and the like are not necessarily to be maintained exactly in the proportions and relations shown, but may be varied so as to produce the most effective operating temperature of the motor in the temperature range for which such motor is designed.

As has been stated, the structures herein described have been found by experiment to not only maintain adequate operating temperatures for the motor to which they are applied, but have shown a quality of compensating effectively for external conditions imposed upon the motor through outside climatic variations in temperature. Another feature which has been noted in connection with such devices has been the adaptability of the structure to variations to compensate for localized concentrations of heat and to bring about their equalization. A further feature of the invention comprises the rapidity with which the motor may be brought up to standard operating temperature and the freedom of the motor from the difficulties which occasionally arise in the operation of a motor, particularly what is often referred to as the "building up of heat".

Other modes of applying the principle of my invention may be employed instead of those explained, change being made as regards the structures herein disclosed, provided the means stated by any of the following claims or the equivalent of such stated means be employed.

I therefore particularly point out and distinctly claim as my invention:

1. An apparatus of the character described having in combination an internal combustion engine, a head member therefor comprising a solid single wall structure for its area directly over the combustion chamber and formed of metal of high heat conduction and radiation characteristics, and fluid receiving depressions with intervening webs on said head member for radiating the heat imparted to said head member directly from the combustion chamber and imparted indirectly to said head member through separate fluid receiving passageways for dissipating the heat from the side walls of said combustion chamber.

2. An apparatus of the character described having in combination an internal combustion engine, a head member therefor comprising a solid single wall structure for its area directly over the combustion chamber and formed principally of aluminum, and fluid receiving depressions with intervening webs on said head member for radiating the heat imparted to said head member directly from the combustion chamber and imparted indirectly to said head member through separate fluid receiving passageways for dissipating the heat from the side walls of said combustion chamber.

3. An apparatus of the character described having in combination an internal combustion engine, a head member therefor comprising a solid single wall structure for its area directly over the combustion chamber and formed principally of aluminum, and intersecting webs forming rectangular pockets having rounded side and bottom corner portions and producing convection currents formed on the top surface of said head member for radiating the heat imparted to said head member through the engine operation.

4. An apparatus of the character described having in combination an internal combustion engine, a head member therefor comprising a solid single wall structure for its area directly over the combustion chamber and formed principally of aluminum, the wall of said head member being relatively thin and having on its top surface a series of integral intersecting web members forming rectangular pockets having rounded side and bottom corner portions and producing convection currents serving as head reinforcing means and as means for radiating the heat caused through the engine operation.

5. An apparatus of the character described having in combination an internal combustion engine a head member therefor comprising a solid single wall structure for its area directly over the combustion chamber and formed principally of aluminum, the wall of said head member being relatively thin and having on its top surface two parallel series of web members intersecting each other, one of said series having its upper marginal portions projecting slightly beyond the upper marginal portions of the intervening series so as to direct air flow over said head member between such projecting marginal portions.

6. An apparatus of the character described having in combination an internal combustion engine, a head member therefor comprising a solid single wall structure for its area directly over the combustion chamber and formed of metal of high heat conduction and radiation characteristics, means on said head member for radiating the heat imparted thereto through the engine operation, said head member having conduit means along one side thereof forming a water passageway, and heat radiating means on said conduit means.

7. An apparatus of the character described having in combination an internal combustion engine, a head member therefor comprising a solid single wall structure for its area directly over the combustion chamber and formed of metal of high heat conduction and radiation characteristics, means on said head member for radiating the heat imparted thereto through the engine operation, said head member having conduit means along one side thereof forming a water passageway, and heat radiating members projecting outwardly from the outer surface of said conduit means.

8. An apparatus of the character described having in combination an internal combustion engine, a head member therefor comprising a solid single wall structure for its area directly over the combustion chamber and formed of metal of high heat conduction and radiation characteristics, means on said head member for radiating the heat imparted thereto through the engine operation, said head member having conduit means along one side thereof forming a water passageway, and heat transferring members projecting inwardly from the inner walls of said conduit means.

9. An apparatus of the character described having in combination an internal combustion engine, a head member therefor comprising a solid single wall structure for its area directly over the combusion chamber and formed of metal of high heat conduction and radiation characteristics, means on said head member for radiating the heat imparted thereto through the engine operation, said head member having conduit means along one side thereof forming a water passageway, web members projecting outwardly from the outer surface of said conduit means, and heat transferring web members projecting inwardly from the inner walls of said conduit means.

10. An apparatus of the character described having in combination an internal combustion engine, a head member therefor comprising a solid single wall structure for its area directly over the combustion chamber and formed of metal of high heat conduction and radiation characteristics, means on said head member for radiating the heat imparted thereto through the engine operation, said head member having conduit means along one side thereof forming a water passageway, web members projecting outwardly from the outer surface of said conduit means, and heat transferring web members projecting inwardly from the inner walls of said conduit means, said web members being integrally formed with the walls of the conduit means.

11. An apparatus of the character described having in combination an internal cumbustion engine, a head member therefor comprising a solid single wall structure for its area directly over the combustion chamber and formed of metal of high heat conduction and radiation characteristics, means on said head member for radiating the heat imparted thereto through the engine operation, said head member having conduit means along one side thereof forming a water passageway, web members projecting outwardly from the outer surface of said conduit means, and heat transferring web members projecting inwardly from the inner walls of said conduit means, said web members being integrally formed with the walls of the conduit means, and the outwardly projecting and inwardly projecting web members being in substantial alignment with each other so as to form in effect continuous plates intersecting the wall of the conduit means.

12. An apparatus of the character described having in combination an internal cumbustion engine, a head member therefor comprising a solid single wall structure for its area directly over the combustion chamber and formed of metal of high heat conduction and radiation characteristics, means on said head member for radiating the heat imparted thereto through the engine operation, said head member having conduit means along one side thereof forming a water passageway, and heat radiating web members projecting outwardly from the outer surface of said conduit means, said web members being in the form of spaced plates extending longitudinally of said conduit means.

13. An apparatus of the character described having in combination an internal combustion engine, a head member therefor comprising a solid single wall structure for its area directly over the combustion chamber and formed of metal of high heat conduction and radiation characteristics, means on said head member for radiating the heat imparted thereto through the engine operation, said head member having conduit means along one side thereof forming a water passageway, and heat transferring web members projecting inwardly from the inner walls of said conduit means, said web members being in the form of spaced plates extending longitudinally of said conduit means.

14. An apparatus of the character described having in combination an internal combustion engine, a head member therefor comprising a solid single wall structure for its area directly over the combustion chamber and formed of metal of high heat conduction and radiation characteristics, means on said head member for radiating the heat imparted thereto through the engine operation, said head member having conduit means along one side thereof forming a water passageway, web members projecting outwardly from the outer surface of said conduit means, and heat transferring web members projecting inwardly from the inner walls of said conduit means, said web members being integrally formed with the walls of the conduit means, and being in the form of spaced plates extending longitudinally of the conduit means.

15. An apparatus of the character described having in combination an internal combustion engine, a head member therefor comprising a solid single wall structure for its area directly over the combustion chambers and formed of metal of high heat conduction and radiation characteristics, means on said head member for radiating the heat imparted thereto through the engine operation, a water jacket formed in said engine in spaced relation to the side walls of the cylinders thereof, said head member of said engine having conduit means along one side thereof forming a water passageway connecting with the upper water passageways in said water jacket, and means for directly connecting one end of the conduit means through said head member with the water jacket on the lower portion of said engine.

16. An apparatus of the character described having in combination an internal combustion engine, a head member therefor comprising a solid single wall structure for its area directly over the combustion chambers and formed of metal of high heat conduction and radiation characteristics, means on said head member for radiating the heat imparted thereto through the engine operation, a water jacket formed in said engine in spaced relation to the side walls of the cylinders thereof, said head member of said engine having conduit means along one side thereof forming a water passageway connecting with the upper water passageways in said water jacket, and means for directly connecting one end of the conduit means through said head member with the water jacket on the lower portion of said engine, said means having heat radiating members provided thereon.

17. An apparatus of the character described having in combination an internal combustion engine, a head member therefor comprising a solid single wall structure for its area directly over the combustion chambers and formed of metal of high heat conduction and radiation characteristics, means on said head member for radiating the heat imparted thereto through the engine operation, a water jacket formed in said engine in spaced relation to the side walls of the cylinders thereof, said head member of said engine having conduit means along one side thereof forming a water passageway connecting with the upper water passageways in said water jacket, and means for directly connecting one end of the conduit means through said head member with the water jacket on the lower portion of said engine, said means having heat transferring elements formed integrally therewith and projecting inwardly and outwardly from the wall surfaces of said connecting means.

18. An apparatus of the character described having in combination a V-type internal combustion engine, a head member for each bank of cylinders thereof formed of metal of high heat conduction and radiation characteristics, means on each of said head members for radiating the heat imparted to said members through the engine operation, a water jacket formed in said engine in spaced relation to the side walls of each bank of cylinders thereof, each of said head members of said engine having conduit means along one side thereof forming a water passageway connecting with the upper water passageways of each water jacket respectively, means for directly connecting one end of each conduit means through said head member with the water jacket on each respective lower portion of said engine to form a complete separate water circulating circuit, respectively, and a passageway affording communication with each water circulating circuit for the respective cylinder banks.

19. An apparatus of the character described having in combination a V-type internal combustion engine, a head member for each bank of cylinders thereof formed of metal of high heat conduction and radiation characteristics, means on each of said head members for radiating the heat imparted to said members through the engine operation, a water jacket formed in said engine in spaced relation to the side walls of each bank of cylinders thereof, each of said head members of said engine having conduit means along one side thereof forming a water passageway connecting with the upper water passageways of each water jacket respectively, means for directly connecting one end of each conduit means through said head member with the water jacket on each respective lower portion of said engine to form a complete separate water circulating circuit, respectively, a passageway affording communication with each water circulating circuit for the respective cylinder banks, and a filling tube connecting with said passageway.

20. An apparatus of the character described having in combination an internal combustion engine, a head member therefor comprising a solid single wall structure for its area directly over the combustion chamber and formed of metal of high heat conduction and radiation characteristics, said head member having conduit means along one side thereof, forming a water passageway associated therewith, and heat radiating members projecting from the surfaces of said conduit means.

21. An apparatus of the character described having in combination an internal combustion engine, a head member therefor comprising a solid single wall structure for its area directly over the combustion chamber and formed principally of aluminum, and upstanding members forming pockets having rounded side and bottom corner portions and producing convection currents formed on the top surface of said head member for radiating the heat imparted to said head member through the engine operation.

22. An apparatus of the character described having in combination an internal combustion engine, a head member therefor comprising a solid single wall structure for its area directly over the combustion chamber and formed principally of aluminum, the wall of said head member being relatively thin and having on its top surface a series of upstanding members forming pockets having rounded side and bottom corner portions and producing convection currents serving as head reinforcing means and as means for radiating the heat caused through the engine operation.

23. An apparatus of the character described having in combination an internal combustion engine, a head member therefor comprising a solid single wall structure for its area directly over the combustion chamber and formed principally of aluminum, upstanding members forming pockets having rounded side and bottom corner portions and producing convection currents formed on the top surface of said head member for radiating the heat imparted to said head member through the engine operation, and downwardly projecting members on the under side of said structure to assist in the heat transference.

JOHN SCHMELLER, Sr.